US009444385B2

(12) United States Patent
Kataoka

(10) Patent No.: US 9,444,385 B2
(45) Date of Patent: Sep. 13, 2016

(54) CONTROL APPARATUS FOR VIBRATION TYPE ACTUATOR

(75) Inventor: Kenichi Kataoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 13/991,454

(22) PCT Filed: Dec. 13, 2011

(86) PCT No.: PCT/JP2011/079281
§ 371 (c)(1),
(2), (4) Date: Jun. 4, 2013

(87) PCT Pub. No.: WO2012/086562
PCT Pub. Date: Jun. 28, 2012

(65) Prior Publication Data
US 2013/0257333 A1 Oct. 3, 2013

(30) Foreign Application Priority Data
Dec. 24, 2010 (JP) ................................. 2010-287441

(51) Int. Cl.
H02P 3/00 (2006.01)
H02P 25/02 (2016.01)
H02N 2/14 (2006.01)

(52) U.S. Cl.
CPC ............ *H02P 25/027* (2013.01); *H02N 2/142* (2013.01)

(58) Field of Classification Search
USPC ................. 318/702, 607, 611, 114, 119, 128
See application file for complete search history.

(56) References Cited

U.S. PATENT DOCUMENTS

| 5,001,404 A | 3/1991 | Kataoka |
| 5,004,964 A | 4/1991 | Kataoka et al. |
| 5,157,300 A | 10/1992 | Kataoka et al. |

(Continued)

FOREIGN PATENT DOCUMENTS

| JP | 5-111267 A | 4/1993 |
| JP | 05-176562 A | 7/1993 |

(Continued)

OTHER PUBLICATIONS

International Preliminary Report on Patentability dated Jun. 25, 2013, in International Application No. PCT/JP2011/079281.
Office Action issued in Japanese Patent Application No. 2010-287441, dated Dec. 9, 2014.

(Continued)

*Primary Examiner* — Eduardo Colon Santana
*Assistant Examiner* — Iftekhar Mustafa
(74) *Attorney, Agent, or Firm* — Fitzpatrick, Cella, Harper & Scinto

(57) ABSTRACT

A control apparatus for a vibration type actuator, which uses a vibration wave excited by a vibrating member to actuate a movable member in contact with or indirectly connected to the vibrating member, includes a command unit which gives a command indicating at least one parameter, an AC voltage generator which generates the AC voltage for applying the excitation force to the vibrating member, a variable adding unit which adds a predetermined variable to each of one or more parameters, a frequency response characteristic measuring unit which receives as an input a variable output and outputs a physical quantity and obtains a frequency response characteristic at one or more predetermined frequencies, a resonance frequency estimation unit which estimates a resonance frequency of the vibrating member, and a frequency range limiter which determines a frequency range for the AC voltage output by the AC voltage generator.

7 Claims, 11 Drawing Sheets

(56) References Cited

U.S. PATENT DOCUMENTS

| | | |
|---|---|---|
| 6,608,426 B2 | 8/2003 | Hayashi et al. |
| 7,129,618 B2 | 10/2006 | Fujimoto et al. |
| 2007/0046144 A1* | 3/2007 | Urano .................... H02N 2/004 310/317 |
| 2007/0222407 A1* | 9/2007 | Sakamoto ............. B60W 10/08 318/611 |
| 2008/0030101 A1* | 2/2008 | Funakubo ........... H01L 41/0913 310/316.02 |
| 2009/0066187 A1 | 3/2009 | Kudo |
| 2013/0241446 A1 | 9/2013 | Iwasa et al. |
| 2013/0257223 A1 | 10/2013 | Kataoka |

FOREIGN PATENT DOCUMENTS

| | | |
|---|---|---|
| JP | 7-337043 A | 12/1995 |
| JP | 08-308267 A | 11/1996 |
| JP | 3138309 B2 | 2/2001 |
| JP | 3286606 B2 | 5/2002 |
| JP | 3340522 B2 | 11/2002 |
| JP | 2007-159291 A | 6/2007 |
| JP | 2010-11716 A | 1/2010 |
| JP | 2010-263672 A | 11/2010 |

OTHER PUBLICATIONS

International Search Report and Written Opinion mailed Apr. 12, 2012 in PCT/JP2011/079281.

* cited by examiner (A)　　(B)　　(C)　　(D)

CONTROL APPARATUS FOR VIBRATION TYPE ACTUATOR

TECHNICAL FIELD

The present invention relates to a control apparatus for a vibration type actuator which generates a vibration wave at a vibrating member by applying an AC voltage to an electrical-mechanical energy converting element and frictionally drives a movable member with the vibration wave.

The present invention relates, more particularly, to a control technique for preventing a phenomenon in which the frequency of an excitation force that excites a vibrating member reaches a frequency range lower than the resonance frequency of the vibrating member to abruptly stop a vibration type actuator when controlling the speed of the vibration type actuator by controlling the frequency of the excitation force to fall within a frequency range higher than the resonance frequency of the vibrating member.

BACKGROUND ART

The speed of a vibration type actuator varies with the amplitude of a vibration wave that is excited by a vibrating member. For this reason, the speed is controlled by varying the amplitude and frequency of an AC voltage to be applied to an electrical-mechanical energy converting element provided at the vibrating member.

The process of controlling speed while varying the frequency of an AC voltage is often used to reduce the effects of temperature-related variations in the resonance frequency of a vibrating member and differences in resonance frequency among individual vibrating members.

However, in the case where a target speed is too high or larger-than-expected load torque or thrust is applied, the target speed may not be reached even when the frequency of the AC voltage reaches the resonance frequency of the vibrating member.

For this reason, the vibration type actuator may decelerate or stop abruptly, and unusual noise may be generated. In some cases, a friction surface of the vibrating member or a movable member may be damaged to degrade the durability performance. The process of allowing sufficient latitude in load conditions and the target speed, the process of measuring a resonance frequency and determining a lowest frequency in advance, and other processes have conventionally been proposed to cope with such phenomena.

There is also proposed the process of measuring a physical phenomenon which varies with the difference between the frequency of an AC voltage as described above and the resonance frequency of a vibrating member and controlling the frequency of the AC voltage so as not to exceed the resonance frequency of the vibrating member.

As one of the methods, PTL 1 proposes the method below.

In the method in PTL 1, a sensor which measures vibration of a vibrating member is provided to detect a phase lag of vibration or vibration amplitude with respect to an AC voltage to be applied to an electrical-mechanical energy converting element. A lower limit frequency for the AC voltage is determined based on the detected data and is stored in memory in advance.

The frequency of the AC voltage is controlled so as not to fall below the lower limit frequency and within a low frequency region.

PTL 2 presents the method below. In the method in PTL 2, an AC voltage for measuring the damping capacitance of a piezoelectric element is superimposed on an AC voltage to be applied to an electrical-mechanical energy converting element of a vibration type actuator to measure the damping capacitance.

A series resonant circuit current obtained by subtracting an AC current flowing into the damping capacitance from an AC current flowing through the piezoelectric element is obtained.

Since the series resonant circuit current flows in proportion to the vibration speed of a vibrating member, the temporal phase difference between the AC voltage applied to the piezoelectric element and the series resonant circuit current is obtained, and the frequency of the AC voltage is controlled such that the phase difference is a predetermined phase (e.g., 0°).

With these operations, the frequency of the AC voltage is made to follow a change in the resonance frequency of a series resonant circuit.

In the method in PTL 1, a resonant condition is detected with a vibration detecting sensor provided at the vibrating member and the phase difference from the applied voltage. Accordingly, in the case where the amplitude of the vibrating member is small, an offset may be superimposed on the phase difference due to a change in the pressurized contact state between the vibrating member and a movable member, and the method suffers from the problem of instability.

It is difficult to cope with a change in the resonance frequency of the vibrating member caused by a temperature change by storing a lower limit frequency in advance during the step of detecting a resonant condition.

In the method in PTL 2, oscillation of the vibrating member is detected by measuring the series resonant circuit current, and a resonant condition is detected by the phase difference between the applied voltage and the vibration. The method has a problem with the accuracy of detecting a phase difference at a frequency away from the resonance frequency when the amplitude of the vibrating member is small.

In the process of detecting a current resonant condition by the vibration sensor, in the case where the frequency of an applied voltage is swept at high speed due to, e.g., an abrupt load variation, a delay in phase detection by the vibration detecting sensor may cause the frequency of the applied voltage to exceed or fall below the resonance frequency of the vibrating member.

The methods in PTL 1 and PTL 2 both require a vibration detecting sensor in order to detect a resonant condition.

CITATION LIST

Patent Literature

PTL 1: Japanese Patent No. 3,340,522
PTL 2: Japanese Patent No. 3,286,606

SUMMARY OF INVENTION

The present invention has been made in consideration of the above-described problems, and has as an object to provide a control apparatus for a vibration type actuator which does not detect the amplitude of a vibrating member, controls a frequency of an applied voltage so as not to exceed a resonance frequency of the vibrating member even in the event of an abrupt load variation, and enables stable driving.

A control apparatus for a vibration type actuator according to the present invention is a control apparatus for an vibration type actuator using a vibration wave excited by a vibrating member, a movable member in contact with or indirectly connected to the vibrating member moving relatively by a friction force caused by the vibration wave, including a command unit which gives a command indicating at least one parameter selected from the group consisting of frequency, amplitude, and phase at an AC voltage for applying an excitation force to the vibrating member, an AC voltage generator which generates the AC voltage for applying the excitation force to the vibrating member based on the command from the command unit, a variable adding unit which adds a predetermined variable to each of one or more parameters selected from the group consisting of frequency, amplitude, and phase at the AC voltage, a frequency response characteristic measuring unit which receives as an input a variable output by the variable adding unit and outputs a physical quantity varying with vibration of the vibrating member and obtains a frequency response characteristic at one or more predetermined frequencies, a resonance frequency estimation unit which estimates a resonance frequency of the vibrating member from the frequency response characteristic obtained by the frequency response characteristic measuring unit, and a frequency range limiter which determines a frequency range for the AC voltage output by the AC voltage generator according to an estimated value for the resonance frequency output from the resonance frequency estimation unit.

According to the present invention, it is possible to implement a control apparatus for a vibration type actuator which does not detect an amplitude of a vibrating member, controls a frequency of an applied voltage so as not to exceed a resonance frequency of the vibrating member even in the event of an abrupt load variation, and enables stable driving.

Further features of the present invention will become apparent from the following description of exemplary embodiments with reference to the attached drawings.

DESCRIPTION OF EMBODIMENTS

Modes for carrying out the present invention are described by the embodiments below.

Embodiments

First Embodiment

A configuration example of a control apparatus for a vibration type actuator to which the invention is applied is described as a first embodiment.

A vibration type actuator is an actuator which vibrates a metal or ceramic elastic body using a resonance phenomenon with a natural mode of vibration and moves a movable member in contact with or indirectly connected to the elastic body relative to the elastic body. Actuators using different principles are now proposed as vibration type actuators. Although a piezoelectric element is mainly used as an excitation force source for excitation, a vibration type actuator can, in principle, be implemented using any excitation unit.

For example, excitation can be performed using various actuators such as a magnetostrictive element, an electrostrictive element, a voice coil, an electrostatic actuator or the like.

These actuators can generate an excitation force by inputting an AC voltage or an AC current at the same frequency as an exciting frequency. An AC voltage to be applied corresponds to an excitation force in the case of a piezoelectric element while an AC current corresponds to an excitation force in the case of a voice coil. A vibration type actuator is described below in the context of a piezoelectric element.

Figure 2A:
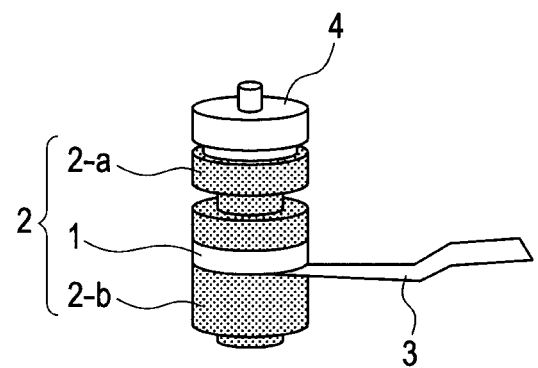
FIG. 2A is a view for describing a vibration type actuator according to the first embodiment of the present invention and is a configuration view illustrating an example of the vibration type actuator.
Figure 2B:
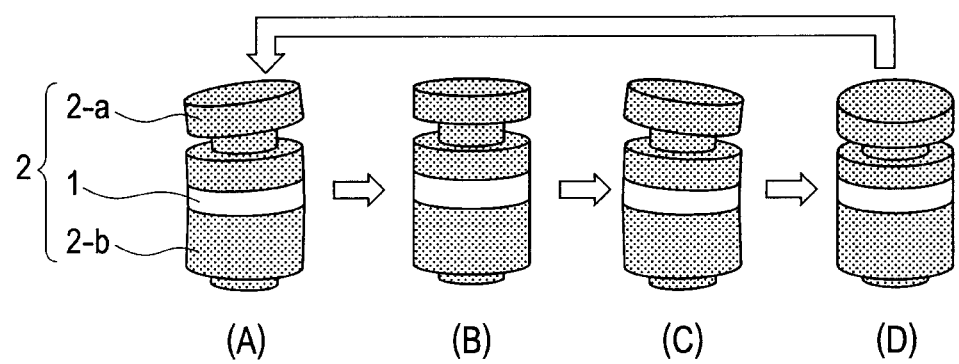
FIG. 2B is a view for describing the vibration type actuator according to the first embodiment of the present invention and is a view illustrating how the vibration type actuator vibrates.

FIG. 2A is a configuration view illustrating an example of a vibration type actuator, and FIG. 2B is a view illustrating how the vibration type actuator vibrates.

In FIGS. 2A and 2B, a piezoelectric element 1 is held between elastic bodies 2-a and 2-b. The piezoelectric element 1 and the elastic bodies 2-a and 2-b together constitute a vibrating member 2.

A flexible board 3 is for supplying power to the piezoelectric element 1. A rotor 4 is formed on an upper surface of the vibrating member 2 and rotates by a friction force which is generated by elliptic oscillation.

The vibrating member 2 has natural modes of vibration for bending vibrations in two directions orthogonal to each other. In the case where vibrations with the two natural modes of vibration are generated so as to be temporally 90° out of phase with each other, the vibrating member 2 is rotationally driven such that an upper structure of the vibrating member 2 rotates about a neck portion as a point of support while wobbling, as in FIG. 2B.

A force derived from the vibrations is transmitted to the rotor 4, which is pressed against an upper portion of the vibrating member 2 by a pressurization unit (not shown) via a friction force. A rotary output is extracted from the transmitted force.

Figure 3:
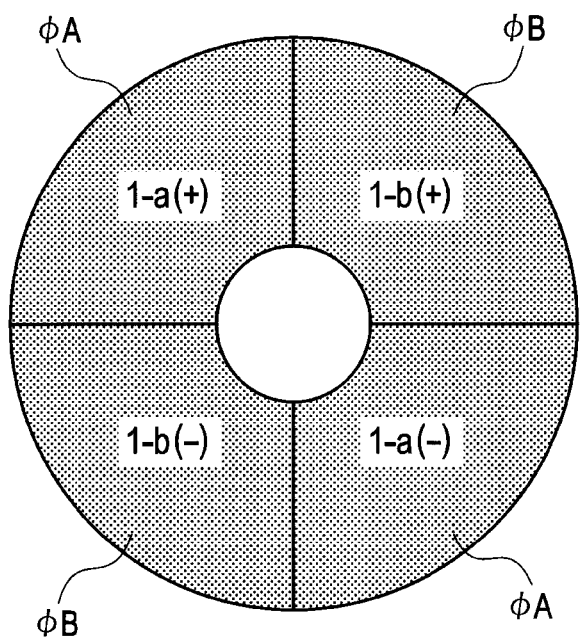
FIG. 3 is a chart illustrating a power supply electrode pattern which is provided in a piezoelectric element, according to the first embodiment of the present invention.

FIG. 3 illustrates a power supply electrode pattern which is formed on the piezoelectric element 1.

An electrode is divided into four sections. An AC voltage ϕA or ϕB is supplied to each electrode section via the flexible board 3.

The signs of electrode sections 1-a(+), 1-a(−), 1-b(+), and 1-b(−) of the piezoelectric element 1 each indicate a direction of polarization of the piezoelectric element 1, and facing ones of the electrode sections are polarized to have opposite polarities.

Application of the same drive voltage to the facing electrode sections generates excitation forces in opposite directions, and vibrations with the natural modes of vibration are excited for the AC voltages ϕA and ϕB, respectively.

Figure 4:
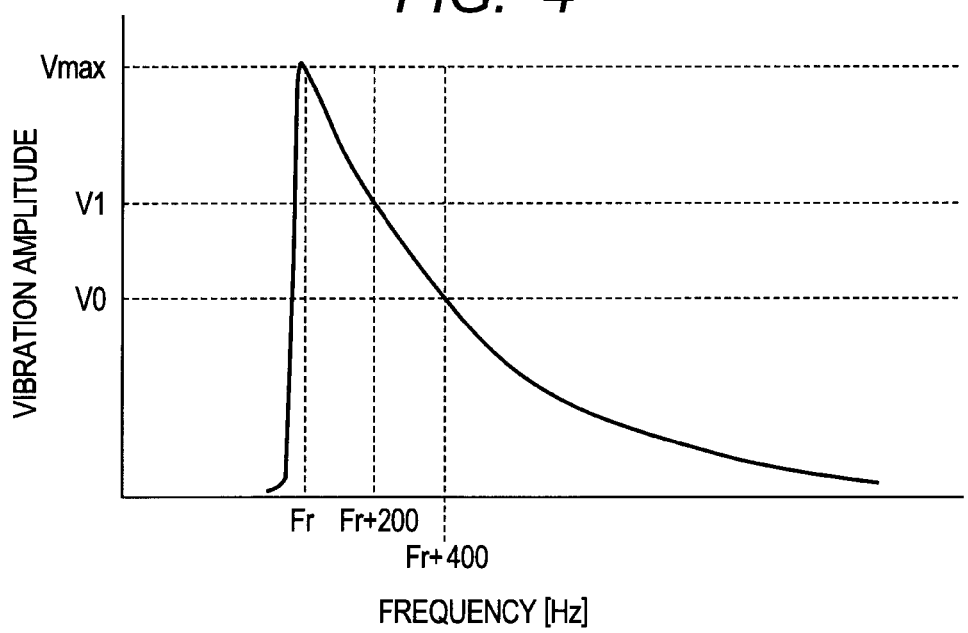
FIG. 4 is a graph illustrating the relationship between the vibration frequency of a vibrating member and the vibration amplitude of the vibrating member, according to the first embodiment of the present invention.

FIG. 4 is a graph illustrating the relationship between the frequency of vibration excited by the vibrating member 2 of the vibration type actuator and the vibration amplitude of the vibrating member 2.

At a resonance frequency Fr of the vibrating member 2, the vibration amplitude of the vibrating member 2 is Vmax.

As the frequency approaches the resonance frequency Fr from a region higher than the resonance frequency Fr, the vibration amplitude of the vibrating member 2 increases gradually to approach Vmax.

When the frequency becomes lower than the resonance frequency Fr, the vibration amplitude decreases drastically. The illustrated characteristic is asymmetrical.

The vibration amplitude of the vibrating member 2 is V1 at a frequency higher by 200 Hz than the resonance frequency Fr while the vibration amplitude of the vibrating member 2 is V0 at a frequency higher by 400 Hz.

A result of comparing rates of change in the vibration amplitude of the vibrating member 2 with respect to frequency at the frequencies indicates that the rate of change is higher at the frequency higher by 200 Hz than the resonance frequency Fr than at the frequency higher by 400 Hz.

Figure 5A:
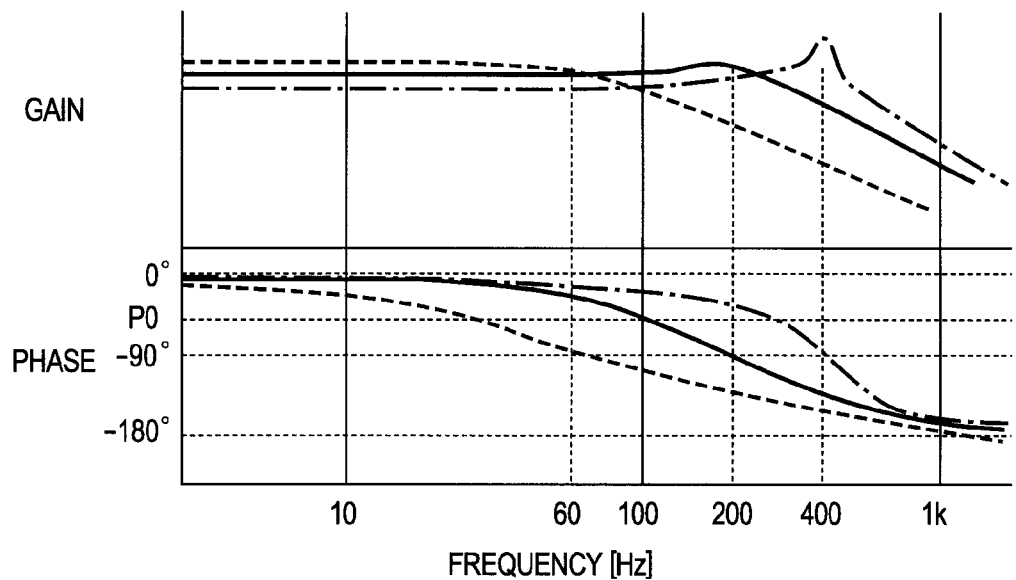
FIG. 5A is a Bode diagram illustrating a frequency response characteristic representing the vibration amplitude of the vibrating member for the frequency of AC voltages to be applied to the piezoelectric element, according to the first embodiment of the present invention.

FIG. 5A is a Bode diagram illustrating a frequency response characteristic representing a change in the vibration amplitude of the vibrating member 2 for a change in the frequency of the AC voltages for exciting the vibrating member 2 of the vibration type actuator.

The characteristics indicated by the solid lines are characteristics obtained when the frequency of the AC voltages is varied within a range centered on the frequency higher by 200 Hz than the resonance frequency Fr illustrated in FIG. 4. The characteristics indicated by the alternate long and short dashed lines are characteristics obtained when the frequency of the AC voltages is varied within a range centered on the frequency higher by 400 Hz than the resonance frequency Fr.

The characteristics indicated by the broken lines are characteristics obtained when the frequency of the AC voltages is varied about the resonance frequency Fr.

In the frequency response characteristic of the vibration type actuator using a resonance characteristic, a corner frequency changes mainly depending on a Q factor of the vibrating member in the vicinity of the resonance frequency Fr.

The corner frequency changes generally depending on the difference between the resonance frequency Fr and the center frequency of the AC voltages for exciting the vibrating member 2 in a frequency region away from the resonance frequency Fr.

Since the solid lines indicate characteristics obtained when the frequency of the AC voltages is varied within a range centered on the frequency higher by 200 Hz than the resonance frequency Fr, a gain characteristic curve falls from a corner frequency of about 200 Hz.

Since the alternate long and short dashed lines indicate characteristics obtained when the frequency of the AC voltages is varied within a range centered on the frequency higher by 400 Hz than the resonance frequency Fr, a gain characteristic curve falls from a corner frequency of about 400 Hz.

As can be seen from the phase characteristics, the phases are about −90° at the corner frequencies and converge in the vicinity of −180° at higher frequencies.

The characteristics indicated by the broken lines are characteristics when the frequency of the AC voltages is in the vicinity of the resonance frequency Fr.

Although the frequency difference between the frequency of the AC voltages and the resonance frequency Fr is close to 0, the corner frequency is 60 Hz.

A corner frequency is a frequency which depends on a Q factor representing the vibration performance of the vibrating member 2. In the case where the frequency difference between the frequency of the AC voltages and the resonance frequency Fr decreases, the corner frequency converges at a lower limit frequency (60 Hz in this example).

Hereinafter, the magnitude of gain in a low frequency region is described.

As for a change in the vibration amplitude of the vibrating member 2 with respect to a change in the frequency of the AC voltages as illustrated in FIG. 4, when the frequency of the AC voltages approaches the resonance frequency Fr, the rate of change in the oscillation amplitude of the vibrating member 2 increases.

Accordingly, a gain increases as the frequency of the AC voltages approaches the resonance frequency Fr of the vibrating member 2.

Even in a frequency region of 10 Hz or less in FIG. 5A, a gain increases as the frequency of the AC voltages approaches the resonance frequency Fr and exhibits the same characteristic as in FIG. 4.

Although FIG. 5A is a Bode diagram illustrating a characteristic representing a change in the vibration amplitude of the vibrating member 2 for the frequency of the AC voltages, a characteristic representing a change in the vibration amplitude of the vibrating member 2 for a change in the amplitude or phase of the AC voltages is similar to the characteristic.

As for the relationship of the frequency difference between the resonance frequency Fr and the frequency of the AC voltages with the corner frequency, the frequency difference has a value close to the corner frequency in a region with the large frequency difference for any of manipulated variables (frequency, amplitude, and phase). In the case where the frequency difference is close to 0, the deviation of the value from the corner frequency is large.

Figure 5B:
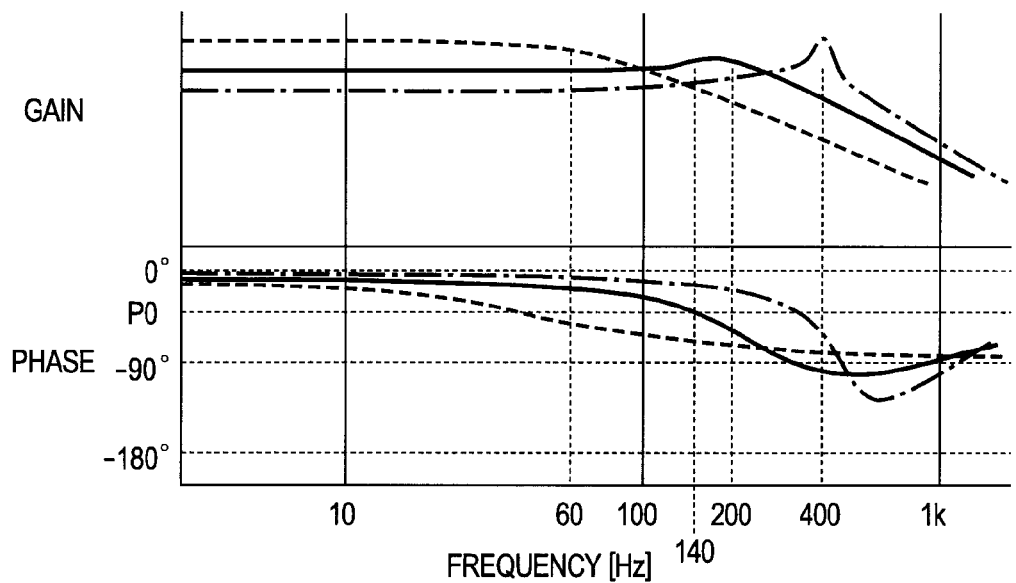
FIG. 5B is a Bode diagram illustrating a frequency response characteristic representing the vibration amplitude of the vibrating member for the amplitude of the AC voltages to be applied to the piezoelectric element, according to the first embodiment of the present invention.

FIG. 5B is a Bode diagram illustrating a characteristic representing a change in the amplitude of the vibrating member for a change in the amplitude of the AC voltages.

FIG. 5B is different from FIG. 5A in that each phase generally varies little and that the peak values of a change in phase differ depending on the frequency of the AC voltages.

The difference among the characteristics indicated by the solid lines, broken lines, and alternate long and short dashed lines is the same as the difference in FIG. 5A, and a description of the difference is omitted. It can be seen from FIG. 5B that the difference in gain resulting from the difference in the frequency of the AC voltages is larger than in FIG. 5A.

The relationship between a corner frequency appearing in a phase characteristic in a Bode diagram as described above and the frequency of AC voltages is not limited to the vibration type actuator illustrated in FIG. 2A.

Although the elastic bodies 2-a and 2-b and the piezoelectric element 1 constitute the vibrating member 2 in FIG. 2A, only a piezoelectric element or any other excitation unit may constitute the vibrating member 2.

In addition to the rod-like vibrating member in FIG. 2A, an vibration type actuator which is formed by combining one of elastic bodies of various shapes, such as an annular shape, a disc shape, and a rectangular plate shape, with a piezoelectric element is available. Many of such vibration type actuators each use the resonance characteristic of a vibrating member including an elastic body and a piezoelectric element. The vibration type actuator relatively moves a body to be moved in contact with the vibrating member by generating, at the vibrating member, a vibration wave in a vibration form dependent on a natural mode of vibration of the vibrating member.

Such type of vibration type actuator that vibrates a vibrating member at a frequency close to a resonance frequency using a resonance phenomenon has frequency response characteristics as illustrated in FIGS. 5A and 5B.

Figure 1:
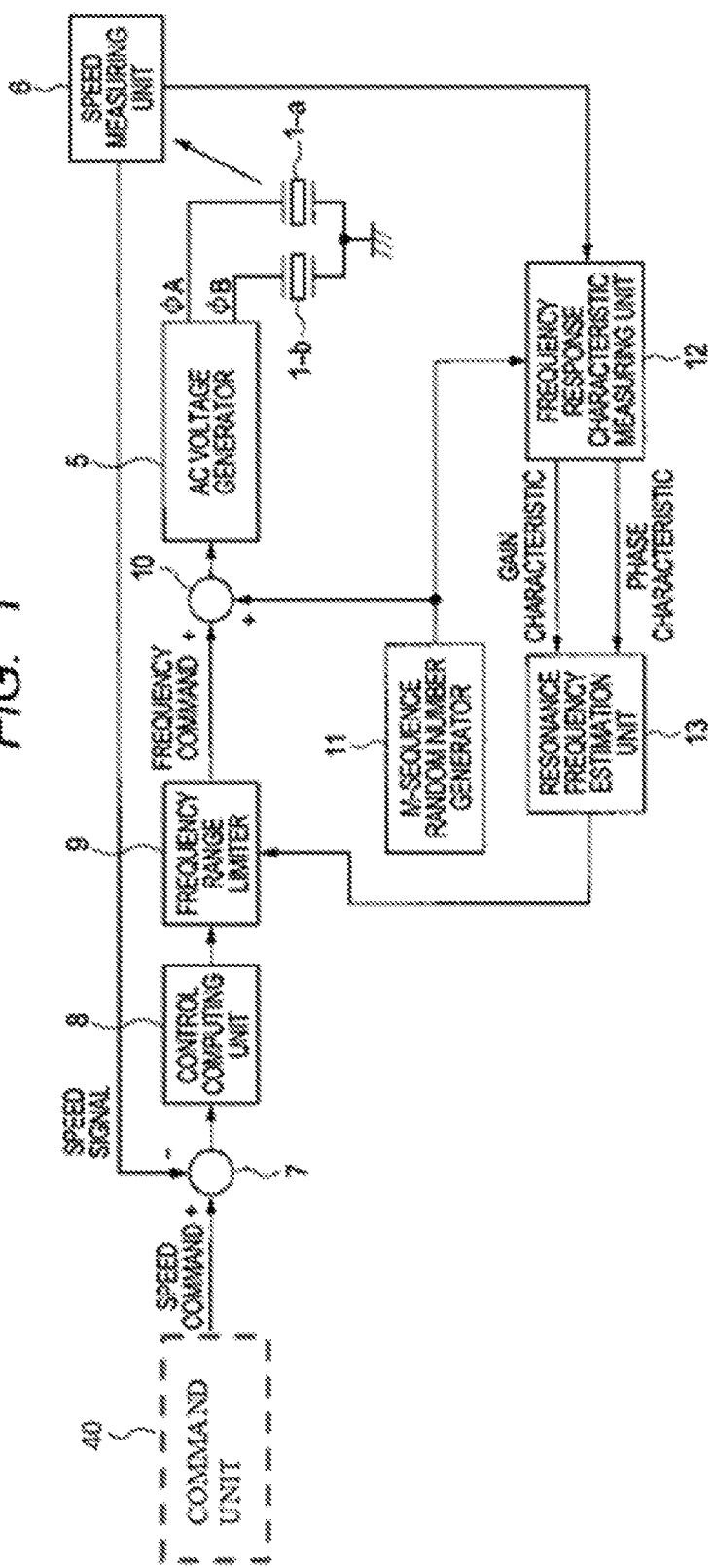
FIG. 1 is a block diagram for describing a configuration example of a control apparatus for a vibration type actuator according to a first embodiment of the present invention.

FIG. 1 is a block diagram illustrating the first embodiment in a control apparatus for a vibration type actuator, and the control apparatus constitutes a system for controlling the rotational speed of the rotor 4 (not shown) according to a speed command from a command unit 40.

An AC voltage generator 5 generates two-phase AC voltages according to a frequency command with an added variable which is output from an adding unit 10 (to be described later) and applies AC voltages φA and φB with a phase difference of 90° between the voltages to the electrodes 1-a and 1-b.

A speed measuring unit 6 such as a rotary encoder detects the rotational speed of the rotor 4 (not shown). A speed comparing unit 7 compares the speed command from the command unit 40 with a speed signal output from the speed measuring unit 6.

The command unit can be configured to give a command indicating a frequency according to one or more physical quantities and the difference from the target value for each physical quantity. A control computing unit 8 performs proportional integral computation on a result of the comparison by the speed comparing unit 7 and controls the frequency of the AC voltages output by the AC voltage generator 5.

In the case where the value of the speed signal is smaller than the speed command, the control computing unit 8 changes the frequency of the AC voltages output by the AC voltage generator 5 to a lower frequency and brings the frequency closer to the resonance frequency of the vibrating member 2, in order to increase the rotational speed of the rotor 4 (not shown).

In the case where the speed signal is larger than the speed command, the control computing unit 8 operates to change the frequency to a higher frequency.

A frequency range limiter 9 is designed to limit a frequency range for a frequency indicated by a signal output from the control computing unit 8.

The frequency range limiter 9 determines a frequency range for the AC voltages output by the AC voltage generator 5 according to an estimated value for the resonance frequency of the vibrating member (not shown) output by a resonance frequency estimation unit (not shown). The frequency range limiter 9 also outputs a frequency command obtained by limiting the frequency indicated by the signal output by the control computing unit 8.

The adding unit 10 adds a random number signal output by an M-sequence random number generator 11 (to be described later) to the frequency command to vary the frequency command.

The M-sequence random number generator 11 is a random number generator using a known M-sequence signal and can generate a pseudo random number signal close to white noise.

The adding unit 10 and M-sequence random number generator 11 constitute a variable adding unit which adds a predetermined variable to at least one parameter selected from the group consisting of frequency, amplitude, and phase at the AC voltages for applying an excitation force to the vibrating member.

In the present embodiment, the variable adding unit can add any of a sine wave signal, white noise, and the like in addition to the pseudo random number signal.

A frequency response characteristic measuring unit 12 obtains a frequency response characteristic of the rotor 4 (not shown) at one or more predetermined frequencies for one of a variable output by the variable adding unit and a physical quantity which varies with vibration of the vibrating member.

The frequency response characteristic measuring unit 12 outputs a gain characteristic and a phase characteristic for a predetermined varying frequency.

A resonance frequency estimation unit 13 estimates the resonance frequency of the vibrating member 2 (not shown) from the gain characteristic and phase characteristic at the predetermined varying frequency output by the frequency response characteristic measuring unit 12. The resonance frequency estimation unit 13 outputs the frequency difference between the frequency of the AC voltages output by the AC voltage generator 5 and the resonance frequency of the vibrating member 2.

The frequency range limiter 9 sets as a lower limit frequency a frequency higher by a predetermined frequency than a frequency obtained by adding the current frequency command and the frequency difference and sets as an upper limit frequency a frequency higher by a predetermined frequency than the lower limit frequency, based on the frequency difference.

Hereinafter, how the frequency range limiter 9 estimates the resonance frequency of the vibrating member 2 is described.

Figure 6:
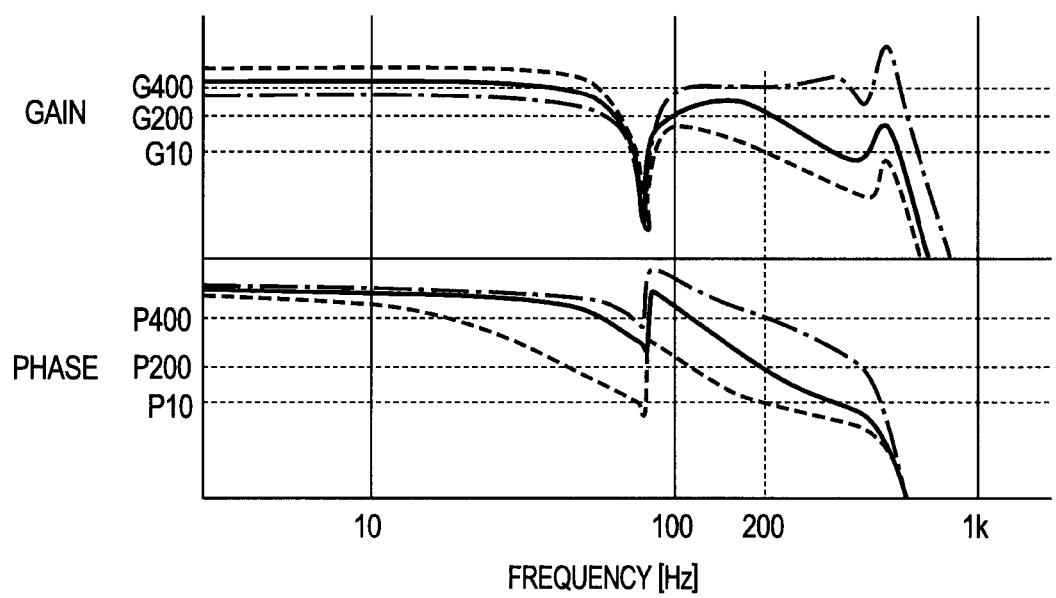
FIG. 6 is a Bode diagram illustrating a frequency response characteristic representing the speed of a rotor for the frequency of the AC voltages to be applied to the piezoelectric element, according to the first embodiment of the present invention.

FIG. 6 is a Bode diagram illustrating a frequency response characteristic representing a change in the rotational speed of the rotor 4 (not shown) for a change in the frequency of the AC voltages output by the AC voltage generator 5.

The solid lines in FIG. 6 indicate a case where the difference between the frequency of the AC voltages output by the AC voltage generator 5 and the resonance frequency of the vibrating member 2 is 200 Hz.

The broken lines indicate characteristics when the difference is 10 Hz while the alternate long and short dashed lines indicate characteristics when the difference is 400 Hz. The frequency represented by the abscissa is the frequency of a variable to be added to the frequency of the AC voltages. The frequency response characteristic measuring unit 12 measures and outputs a gain and a phase when the varying frequency is 200 Hz.

Gains G10, G200, and G400 are gains at the varying frequency of 200 Hz in a case where the difference between the frequency of the AC voltages output by the AC voltage generator 5 and the resonance frequency of the vibrating member 2 is 10 Hz, a case where the difference is 200 Hz, and a case where the difference is 400 Hz, respectively. Similarly, phases P10, P200, and P400 are phases for the cases, respectively.

It can be seen from the above that the gain characteristic and phase characteristic at the varying frequency of 200 Hz vary depending on the difference between the frequency of the AC voltages output by the AC voltage generator 5 and the resonance frequency of the vibrating member 2.

Figure 7:
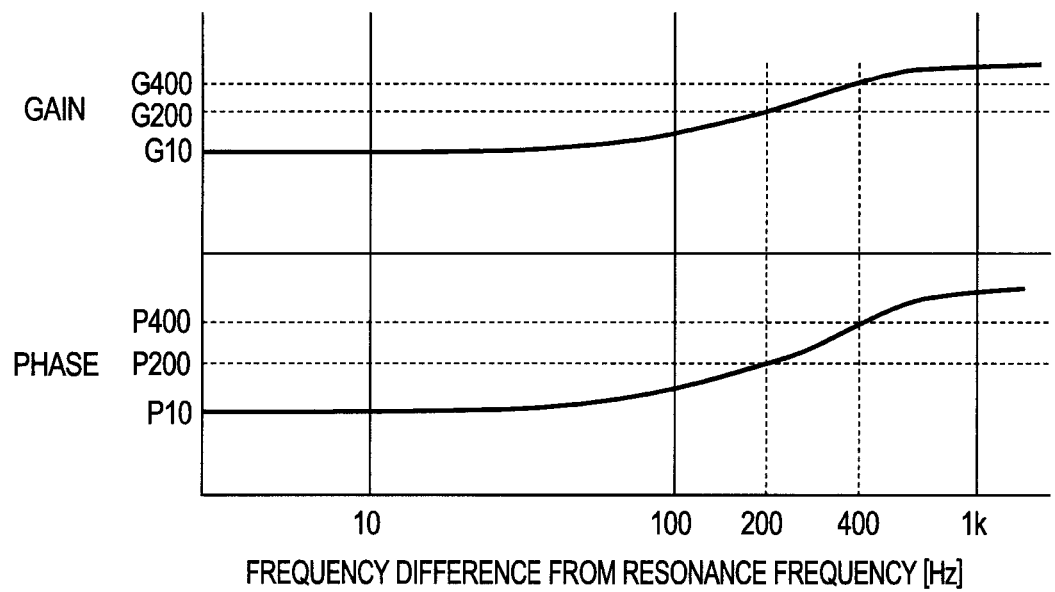
FIG. 7 is a diagram illustrating a change in gain and a change in phase in a frequency response characteristic with respect to the frequency difference between the frequency of the AC voltages to be applied to the piezoelectric element and the resonance frequency of the vibrating member, according to the first embodiment of the present invention.

FIG. 7 illustrates characteristics representing a gain and a phase at the varying frequency of 200 Hz with respect to the frequency difference between the frequency of the AC voltages output by the AC voltage generator 5 and the resonance frequency of the vibrating member 2.

The frequency difference during driving is back-calculated from the gain and phase characteristics by obtaining the relationship between a combination of a gain and a phase and a frequency difference in advance. The process of obtaining a frequency difference from a gain and a phase at each of a plurality of varying frequencies and averaging the frequency differences and the process of obtaining a frequency difference from the plurality of values by least squares approximation are also effective.

When the control computing unit 8 is to perform proportional integral computation, if a frequency command is limited by the frequency range limiter 9, unnecessary integration may be performed in integral computation by the control computing unit 8, and the time required for return to the normal state may be longer. An example in which the problem has been remedied is described below.

Figure 8:
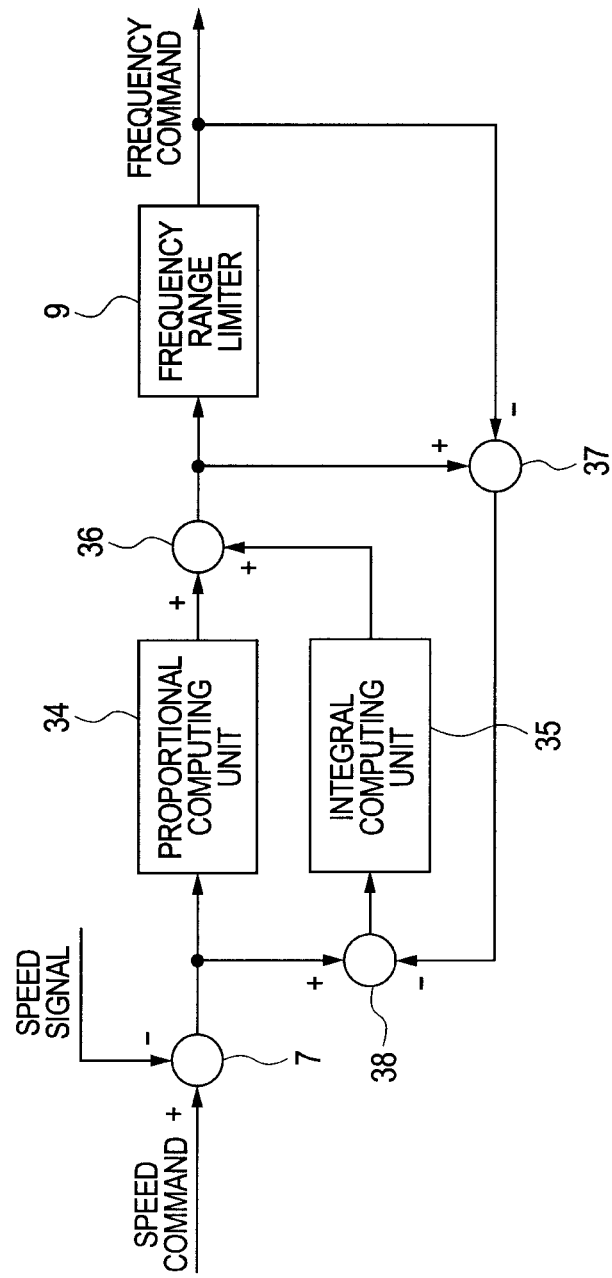
FIG. 8 is a block diagram illustrating a configuration example of a control computing unit, according to the first embodiment of the present invention.

FIG. 8 is a block diagram illustrating a configuration in which measures are taken in the series-connected configuration of the control computing unit 8 and frequency range limiter 9 in FIG. 1.

The control computing unit 8 includes a proportional computing unit 34 which inputs a result of comparison between a speed command and a speed signal output from the speed comparing unit 7 and outputs a proportional value, an integral computing unit 35 which outputs an integrated value, and an adding unit 36 which adds the outputs from the units 34 and 35.

The function of preventing saturation by subtracting a value after frequency limiting is further added to the integral computing unit 35.

Unnecessary integration is prevented by obtaining the difference between a signal before entering the frequency range limiter 9 and the signal output from the frequency range limiter 9 by a subtracter 37 and providing feedback so as to subtract the difference from an integrated value from the integral computing unit 35 using a subtracter 38.

With this configuration, even if restrictions are placed on frequency due to an abrupt load variation, when the load returns to the original value, the restrictions are lifted, and speed control returns to normal operation.

The frequency range limiter includes memory storing the frequency range, and the memory can be configured to store in advance frequency range information corresponding to a phase characteristic output from the frequency response characteristic measuring unit.

The frequency range limiter can be configured to limit the frequency range based on the frequency range information stored in the memory according to the phase characteristic output by the frequency response characteristic measuring unit.

Physical quantities used for estimation are not limited to the speed of the rotor 4 and the vibration amplitude of the vibrating member 2. Any value can be used as long as the value varies depending on the vibration amplitude of the vibrating member 2.

Examples of a physical quantity which varies with a change in the vibration amplitude of the vibrating member 2 include vibration of one of the vibrating member and a mechanism connected to the vibrating member, sound propagating through a medium which surrounds the vibrating member, the speed of a movable member, position, and force to be output. At least one of the physical quantities may be used.

The examples of a physical quantity which varies with a change in the vibration amplitude of the vibrating member 2 also include speed, rotation angle, torque, and the like brought about by rotation of the rotor 4 and current flowing into the piezoelectric element.

These physical quantities all have frequency response characteristics as illustrated in FIGS. 5A and 5B as basic characteristics and can be used as physical quantities for estimating the resonance frequency of the vibrating member 2, as in the embodiment.

According to the configuration of the present embodiment, a physical quantity changed by vibration of one of the vibrating member and a mechanism connected to the vibrating member which varies with an added variable is measured for a variable which is supplied to the variable adding unit.

Measurement without the effects of an offset error can be performed by detecting the difference between the resonance frequency of the vibrating member and the vibration frequency of the vibrating member from a frequency response characteristic to a value of the physical quantity measured for the supplied variable.

Also, a setting range for the frequency of AC voltages to be applied to an electrical-mechanical energy converting element can be limited using various physical quantity sensors.

Since a frequency response characteristic can always be measured, the present embodiment can cope with a change in the resonance frequency of a vibrating member caused by, e.g., a change in temperature during operation.

Second Embodiment

A configuration example of a control apparatus for an vibration type actuator according to a second embodiment is described.

Figure 9:
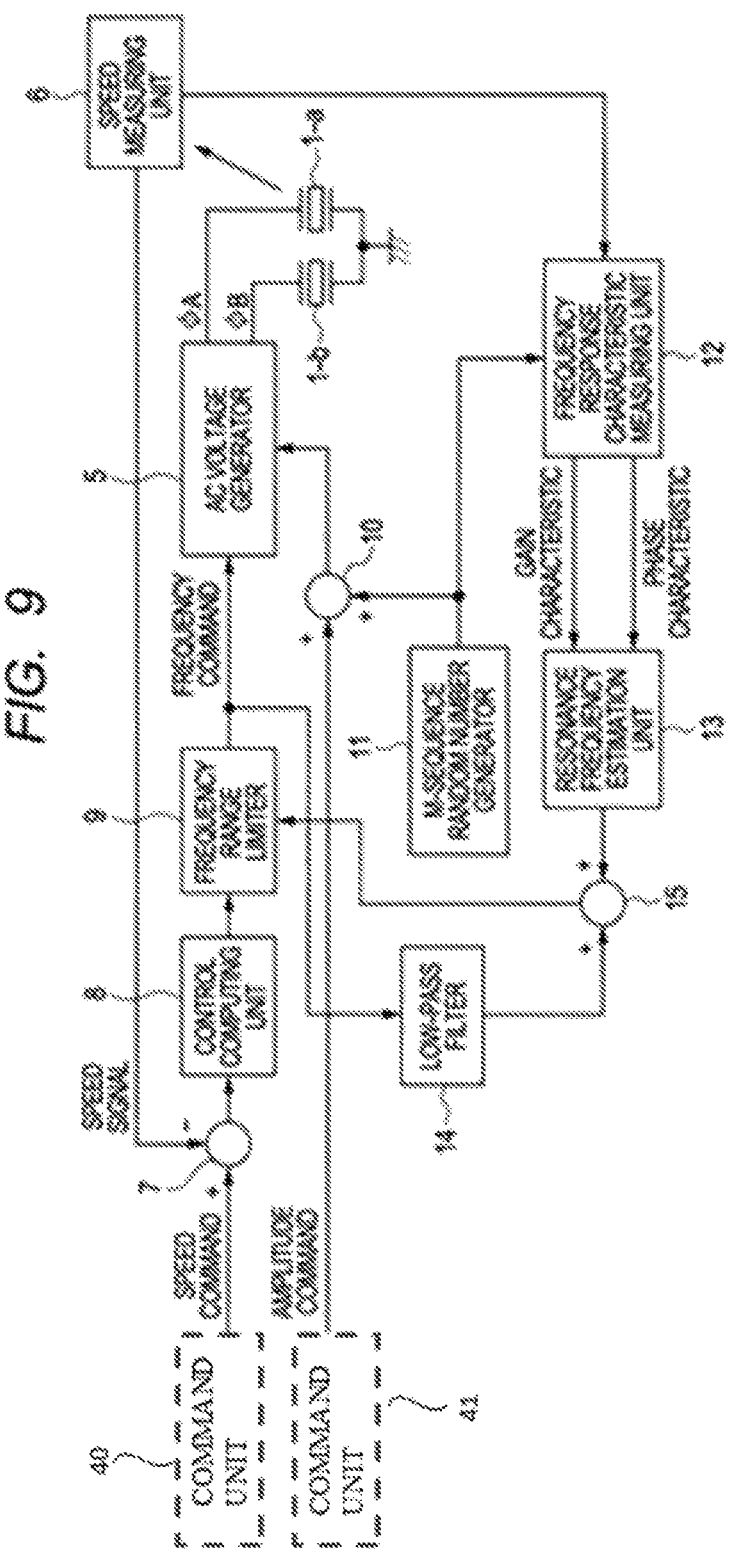
FIG. 9 is a block diagram for describing a configuration example of a control apparatus for a vibration type actuator according to a second embodiment of the present invention.

FIG. 9 is a block diagram for describing the configuration example of the control apparatus for the vibration type actuator according to the present embodiment.

A frequency command is varied in the first embodiment. In contrast, the present embodiment is configured to modulate the amplitude of AC voltages output by an AC voltage generator 5.

The configuration is described below, except for overlaps with the description of FIG. 1.

In FIG. 9, an adding unit 10 adds a variable output by an M-sequence random number generator 11 to an amplitude command from a command unit 41 and outputs the amplitude command.

The amplitude of the AC voltages output by the AC voltage generator 5 is set according to the amplitude command with the added variable.

Figure 10:
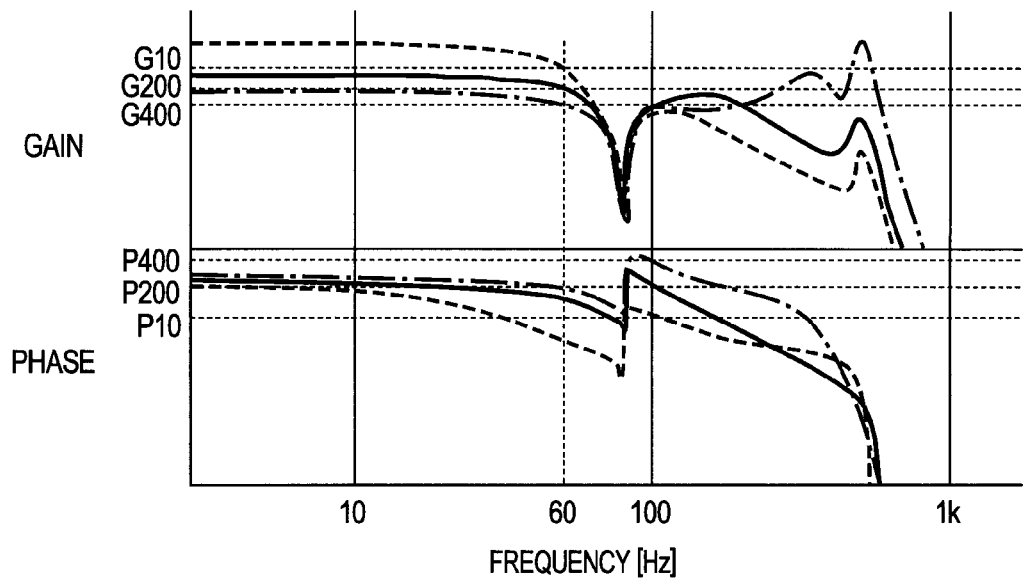
FIG. 10 is a Bode diagram illustrating a frequency response characteristic representing the speed of a rotor for the amplitude of AC voltages to be applied to a piezoelectric element, according to the second embodiment of the present invention.

FIG. 10 illustrates a frequency response characteristic representing a variation in the rotational speed of a rotor 4 for a variation in the amplitude of the AC voltages output by the AC voltage generator 5.

Like FIG. 6, the solid lines indicate a case where the difference between the frequency of the AC voltages output by the AC voltage generator 5 and the resonance frequency of the vibrating member 2 is 200 Hz.

The broken lines indicate characteristics when the difference is 10 Hz while the alternate long and short dashed lines indicate characteristics when the difference is 400 Hz. The frequency represented by the abscissa is the frequency of a variable to be added to the frequency of the AC voltages. A frequency response characteristic measuring unit 12 measures and outputs a gain and a phase at a varying frequency of 60 Hz and at the varying frequency of 100 Hz.

Gains G10, G200, and G400 are gains at the varying frequency of 60 Hz in a case where the difference in frequency between the frequency of the AC voltages output by the AC voltage generator 5 and the resonance frequency of the vibrating member 2 is 10 Hz, a case where the difference is 200 Hz, and a case where the difference is 400 Hz, respectively. Similarly, phases P10, P200, and P400 are phases at the varying frequency of 100 Hz for the cases, respectively.

Figure 11:
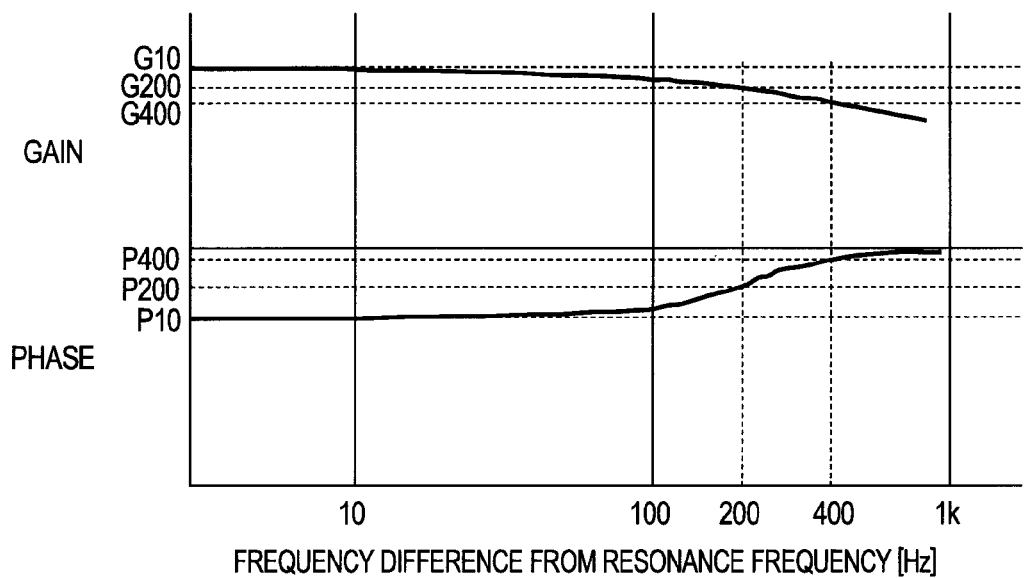
FIG. 11 is a diagram illustrating a change in gain and a change in phase in a frequency response characteristic with respect to the frequency difference between the frequency of the AC voltages to be applied to the piezoelectric element and the resonance frequency of a vibrating member, according to the second embodiment of the present invention.

FIG. 11 illustrates characteristics of a gain at the varying frequency of 60 Hz and a phase at the varying frequency of 100 Hz with respect to the frequency difference between the frequency of the AC voltages output by the AC voltage generator 5 and the resonance frequency of the vibrating member 2.

In the first embodiment, the resonance frequency is estimated using the gain and phase characteristics for the varying frequency of 200 Hz. In the present embodiment, a gain characteristic and a phase characteristic are estimated using different varying frequencies. This is because the resonance frequency cannot be estimated from the gain characteristic at the varying frequency of 100 Hz due to little change in gain, as can be seen from FIG. 10.

As described above, the process of obtaining the characteristics in FIG. 11 in advance enables detection of the frequency difference between the resonance frequency of the vibrating member 2 and the frequency of the AC voltages output by the AC voltage generator 5 from gain and phase characteristics and limiting of a frequency range like the first embodiment.

A resonance frequency estimation unit 13 estimates the difference between the frequency of the AC voltages output by the AC voltage generator 5 and the resonance frequency of the vibrating member 2 at 200 Hz, for example, if the gain characteristic has a gain close to the gain G200 and the phase characteristic has a phase close to the phase P200.

However, estimation of the resonance frequency takes time, and estimated values are an average within a fixed time period required for estimation and a past average corresponding to the amount of data used for estimation.

For this reason, even if the estimated difference of 200 Hz is added to the frequency of the AC voltages output by the current AC voltage generator 5, a correct resonance frequency may not be estimated.

A low-pass filter 14 having a characteristic equivalent to a delay in the frequency response characteristic measuring unit 12 and resonance frequency estimation unit 13 delays and averages frequency commands and adds each frequency command to 200 Hz output by the resonance frequency estimation unit 13, thereby enhancing the accuracy of the estimated value.

Figure 12:
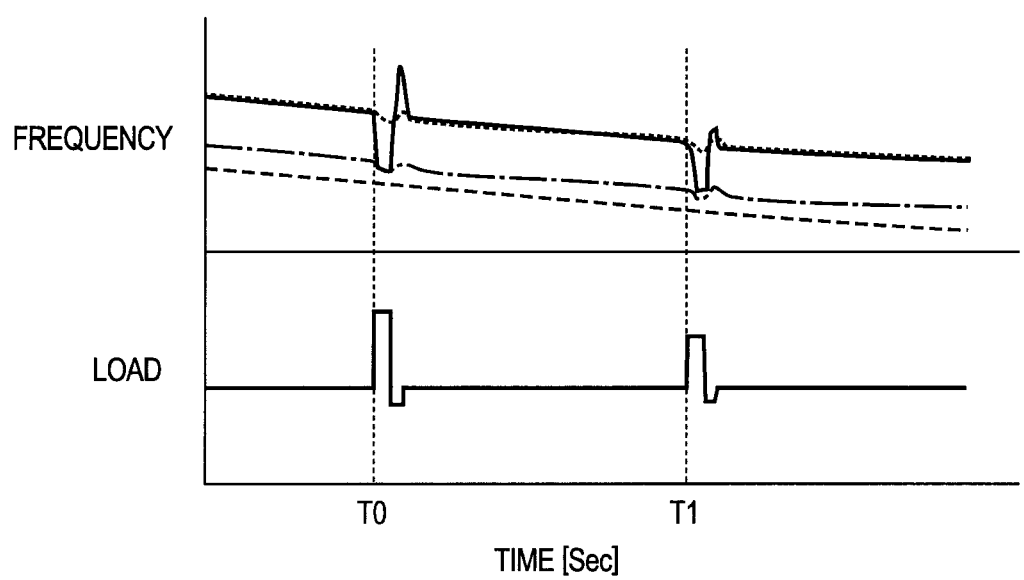
FIG. 12 is a diagram for describing the frequency limiting operation according to the second embodiment of the present invention.

FIG. 12 is a diagram illustrating the frequency limiting operation.

FIG. 12 illustrates a change in the frequency of the AC voltages output by the AC voltage generator 5 (the solid line), a change in output from the low-pass filter 14 (the dotted line), a change in lower limit frequency (the alternate long and short dashed line), and a change in the resonance frequency of the vibrating member 2 (not shown) (the broken line) when the load of the rotor (not shown) increases as a stepped frequency at time T0 and time T1. If the load of the rotor 4 increases, the rotational speed of the rotor 4 decreases, and the frequency of the AC voltages output by the AC voltage generator 5 (the solid line) changes in a direction toward the resonance frequency (the broken line).

The output from the low-pass filter 14 (the dotted line) changes only slightly even when the frequency of the AC voltages (the solid line) changes significantly. A value corresponding to the difference between the resonance frequency (the broken line) and the output from the low-pass filter 14 (the dotted line) is output as the estimated value output by the resonance frequency estimation unit 13.

The estimated value and a value of the output from the low-pass filter 14 (the dotted line) are added by an adding unit 15, and a value generally close to the resonance frequency (the broken line) is input to a frequency range limiter 9. The frequency range limiter 9 sets, as the lower limit frequency (the alternate long and short dashed line), a value obtained by adding a value as a buffer to the value close to the resonance frequency (the broken line).

Although not described in detail, an upper limit frequency may be set to a value obtained by adding a fixed frequency to the lower limit frequency.

Although the amplitude of the AC voltages is varied in the present embodiment, the phase difference between the AC voltages output by the AC voltage generator 5 may be varied.

Driving is generally performed with the AC voltages φA and φB having a phase difference of 90°. The rotational speed of the rotor 4 can be changed by varying the phase difference, like the amplitude of the AC voltages.

A frequency response characteristic varies similarly with the frequency difference between the frequency of the AC voltages and the resonance frequency of the vibrating member 2. Accordingly, the resonance frequency of the vibrating member 2 can be estimated from a gain characteristic and a phase characteristic as the frequency response characteristic.

Although an M-series random number is added as a variable in the embodiment, white noise, any other pseudo random number, a sine wave, or the like may be added as a variable.

The resonance frequency of the vibrating member 2 can be estimated more stably from a phase characteristic than from a gain characteristic. Even only one of the phase characteristic and the gain characteristic enables estimation.

Third Embodiment

A configuration example of a control apparatus for an vibration type actuator according to a third embodiment is described.

Figure 13:
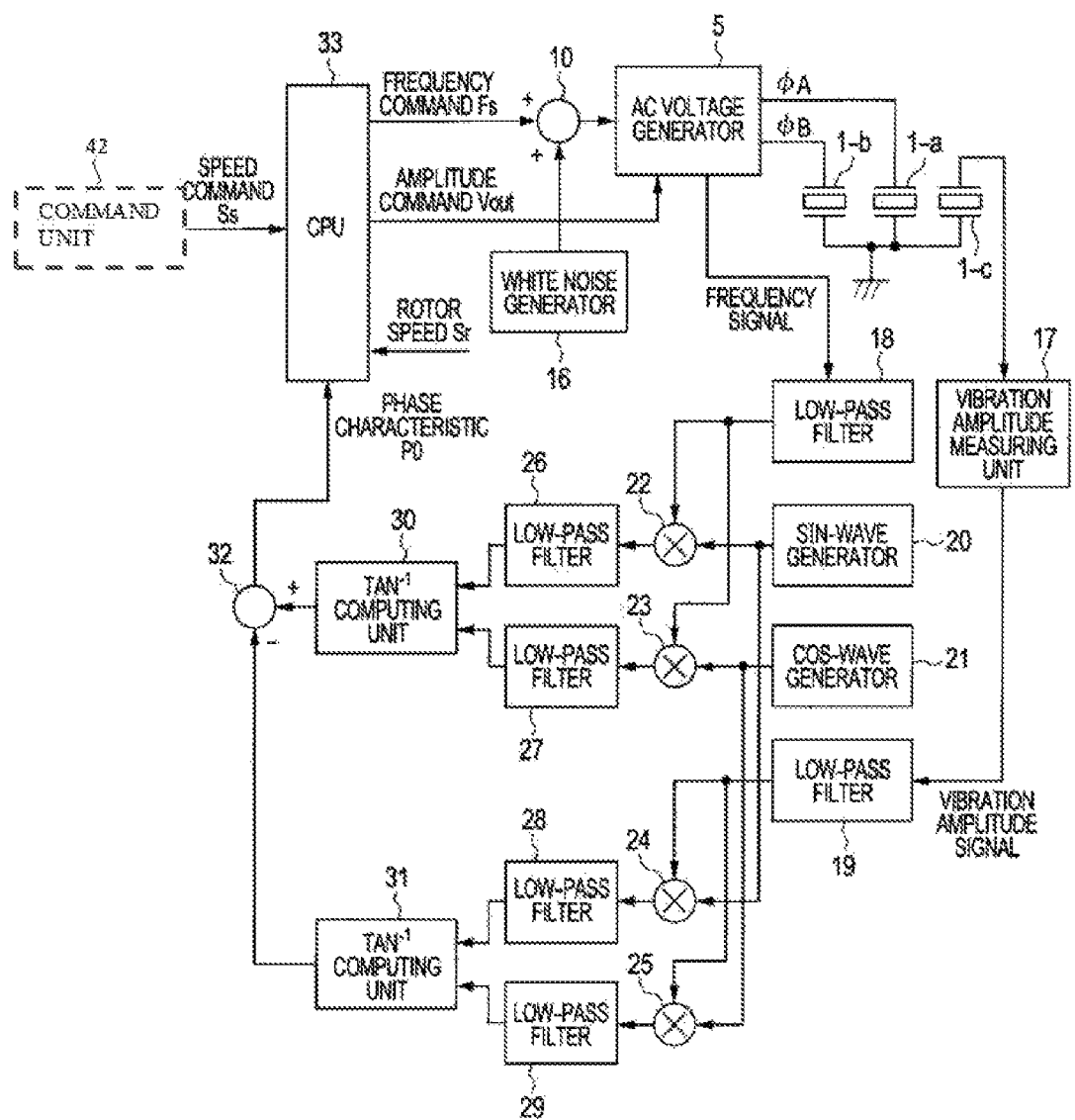
FIG. 13 is a block diagram for describing a configuration example of a control apparatus for a vibration type actuator according to a third embodiment of the present invention.

FIG. 13 is a block diagram for describing the configuration example of the control apparatus for the vibration type actuator according to the present embodiment.

In the above embodiments, a frequency response characteristic to the varied speed of the rotor 4 (not shown) is measured. In the present embodiment, the resonance frequency of an vibrating member 2 (not shown) is estimated using a frequency response characteristic to the vibration amplitude of the vibrating member 2.

Referring to FIG. 13, a known white noise generator 16 generates a variable to be added to a frequency command in the present embodiment, unlike the above embodiments in which the M-sequence random number generator 11 generates a variable.

A vibration detecting sensor 1-*c* using a piezoelectric element is provided at the vibrating member 2 (not shown). A vibration amplitude measuring unit 17 measures the vibration amplitude of the vibrating member 2.

A signal changed by superimposing an output from the white noise generator 16 on a frequency command to be output by an adding unit 10 includes a variable having a frequency characteristic uniform over a wide frequency range. An AC voltage generator 5 samples a frequency command with a superimposed variable on each cycle of AC voltages to be output and determines a frequency for one cycle of the AC voltages.

The frequency of the AC voltages is set when waveforms of the AC voltages are actually output, and a frequency signal is output at the time.

The configuration of a frequency response measuring unit is described.

In the present embodiment, the frequency response measuring unit measures a phase characteristic at 200 Hz between a frequency signal output by the AC voltage generator 5 and a vibration amplitude signal output by the vibration amplitude measuring unit 17.

In principle, the phase characteristic is obtained by generating a sine wave and a cosine wave of 200 Hz, multiplying the frequency signal and the vibration amplitude signal by each of waveforms of the waves and smoothing the resulting signals, obtaining phases of the signals by arctangent computation, and subtracting the phase of the vibration amplitude signal from the phase of the frequency signal.

Blocks in FIG. 13 are described.

Low-pass filters 18 and 19 have the same cut-off frequency that is lower than the frequency of the AC voltages output by the AC voltage generator 5 and is about 10 times 200 Hz.

A SIN-wave generator 20 generates a 200-Hz sine wave, and a COS-wave generator 21 generates a 200-Hz cosine wave.

Multiplying units 22, 23, 24, and 25 multiply each of a band-limited frequency signal and a band-limited vibration amplitude signal output from the low-pass filters 18 and 19 by a sine wave and a cosine wave and output the products.

The outputs from the multiplying units 22, 23, 24, and 25 each have an offset value and a waveform modulated with a frequency twice 200 Hz.

The outputs are smoothed by downstream low-pass filters 26, 27, 28, and 29 having a cut-off frequency of 1 Hz. The phases of the voltage amplitude signals and the vibration amplitude signals are obtained using arctangent computing units 30 and 31, and the difference between the phases is obtained by a phase difference detecting unit 32.

In the embodiment, outputs from the arctangent computing units 30 and 31 are input to the phase difference detecting unit 32. The outputs, however, may be input to the phase difference detecting unit 32 via low-pass filters.

In the two or three series-connected stages of low-pass filters described above, the low-pass filters at each stage need to have the same cut-off frequency.

The cut-off frequency of low-pass filters at each stage may, of course, have a value other than the above-described values.

A SINC filter which is a known decimation filter may be used as each low-pass filter.

Use of a SINC filter enables a reduction in sampling rate and a reduction in computational complexity.

A known CPU 33 outputs an amplitude command Vout which is the amplitude of the AC voltages output by the AC voltage generator 5 and detects a rotor speed Sr. The CPU 33 outputs a frequency command Fs such that a speed command Ss from a command unit 42 and the rotor speed Sr coincide with each other.

The CPU 33 receives as an input a phase characteristic P0 of 200 Hz output from the phase difference detecting unit 32, estimates the resonance frequency of the vibrating member 2, and limits a setting range for the frequency command Fs according to an estimated value for the resonance frequency.

Figure 14:
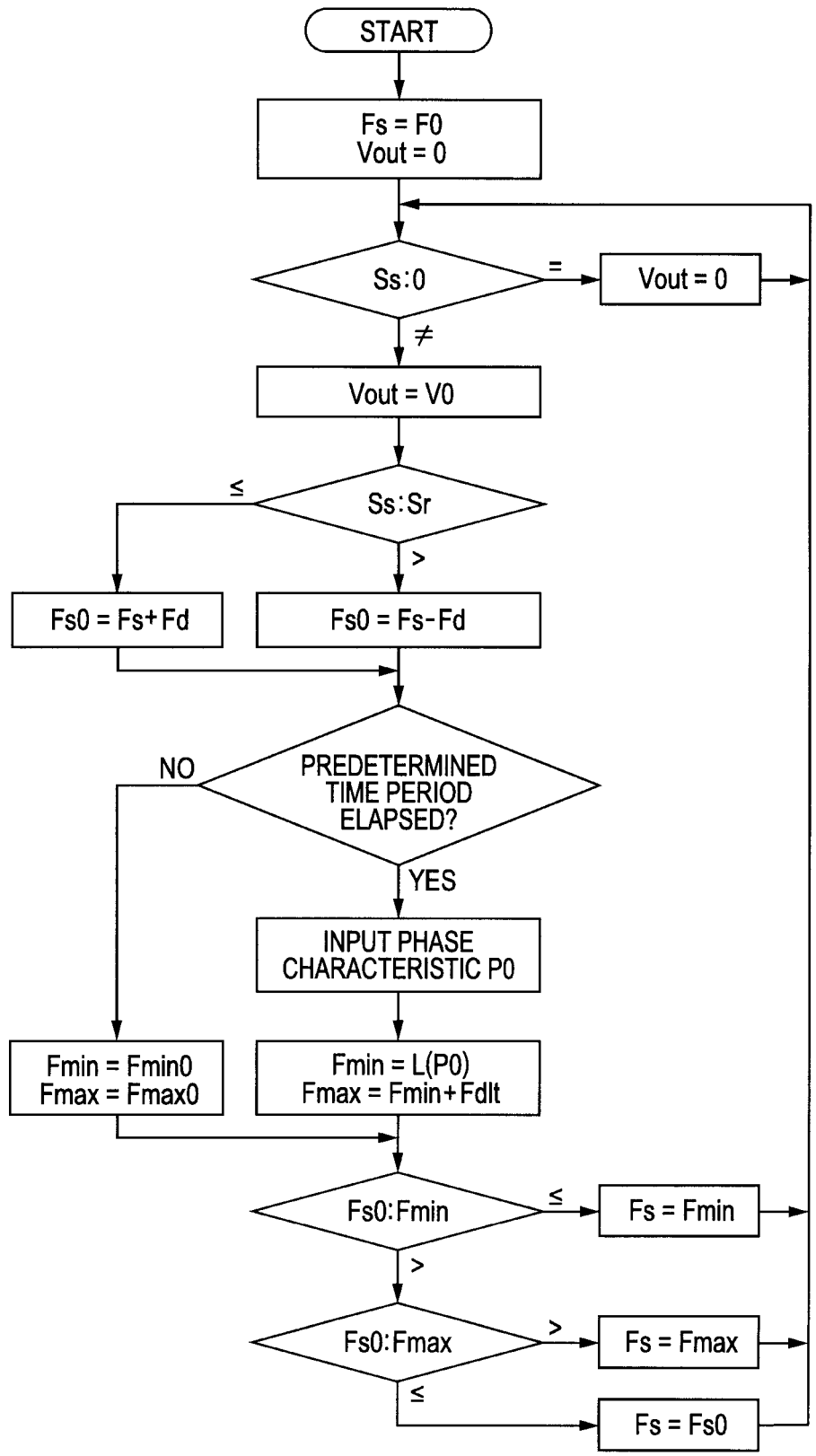
FIG. 14 is a flow chart illustrating the operation of a CPU, according to the third embodiment of the present invention.

FIG. 14 is a flow chart illustrating the operation of the CPU 33.

The operation of the CPU 33 is described with reference to FIG. 14.

First, the CPU 33 initializes the frequency command Fs to a start frequency F0 and the amplitude command Vout to 0.

In the case where the speed command Ss from the command unit 42 is equal to 0, the CPU 33 sets the amplitude command Vout to 0 and waits until the speed command Ss is not equal to 0.

When the speed command Ss is not equal to 0, the CPU 33 sets the amplitude command Vout to a predetermined voltage V0. The setting causes the rotor 4 (not shown) to start rotating, and the rotor speed Sr is greater than 0. The CPU 33 compares the speed command Ss with the rotor speed Sr. In the case where the speed command Ss is greater than Sr, the CPU 33 subtracts a predetermined frequency Fd from the frequency command Fs and substitutes the difference for a frequency variable Fs0, in order to bring the frequency command Fs close to the resonance frequency of the vibrating member 2 (not shown) for acceleration.

On the other hand, in the case where the speed command Ss is equal to or lower than the rotor speed Sr, the CPU 33 adds the predetermined frequency Fd to the frequency command Fs and substitutes the sum for the frequency variable Fs0.

The CPU 33 measures whether a predetermined time period has elapsed since the speed command Ss is no longer 0. In the case where the predetermined time has not elapsed, the CPU 33 uses an initial value as a frequency limiting value.

In that case, the CPU 33 sets a lower limit frequency Fmin to an initial value Fmin0 for a lower limit frequency and an upper limit frequency Fmax to an initial value Fmax0 for an upper limit frequency.

This is because a frequency response characteristic cannot be calculated until the predetermined time period elapses, and the resonance frequency of the vibrating member 2 cannot be estimated.

When the predetermined time period has elapsed, the CPU 33 receives as an input the phase characteristic P0 from the phase difference detecting unit 32 and obtains the lower limit frequency Fmin using a lookup table.

The CPU 33 adds a predetermined frequency range Fdlt to the lower limit frequency Fmin to obtain the upper limit frequency Fmax.

The CPU 33 obtains the frequency command Fs using the obtained lower limit frequency Fmin and upper limit frequency Fmax.

In the case where the frequency variable Fs0 is equal to or lower than the lower limit frequency Fmin, the CPU substitutes the lower limit frequency Fmin for the frequency command Fs. In the case where the frequency variable Fs0 is greater than the upper limit frequency Fmax, the CPU 33 substitutes the upper limit frequency Fmax for the frequency command Fs. In the case where the frequency variable Fs0 is greater than the lower limit frequency Fmin and is equal to or lower than the upper limit frequency Fmax, the CPU 33 substitutes the frequency variable Fs0 for the frequency command Fs.

The steps are repeated until the speed command Ss becomes 0.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-287441, filed Dec. 24, 2010, which is hereby incorporated by reference herein in its entirety.

The invention claimed is:

1. A control apparatus for a vibration type actuator, comprising:
   a command unit which gives a command indicating at least one parameter selected from the group consisting of frequency, amplitude, and phase at an AC voltage;
   a variable adding unit which adds a signal or noise to the command output from the command unit selected from the group consisting of a sine wave signal and a pseudo random number signal as the signal, and white noise as the noise;
   an AC voltage generator which generates the AC voltage based on the command output from the command unit and the signal or the noise output from the variable adding unit;
   a frequency response characteristic measuring unit which receives as an input the signal or the noise output from the variable adding unit and a physical quantity varying with vibration of a vibrating member and obtains a frequency response characteristic at one or more frequencies;
   a resonance frequency estimation unit which estimates a resonance frequency of the vibrating member from the frequency response characteristic obtained by the frequency response characteristic measuring unit; and
   a frequency range limiter which determines a frequency range for the AC voltage output by the AC voltage generator according to an estimated value for the resonance frequency output from the resonance frequency estimation unit.

2. The control apparatus for the vibration type actuator according to claim 1, wherein the physical quantity varying with vibration of the vibrating member comprises one or more physical quantities selected from the group consisting of vibration of one of the vibrating member and a mechanism connected to the vibrating member, sound propagating through a medium which surrounds the vibrating member, a speed of a movable member, a position of the movable member, and a force to be output from the movable member.

3. The control apparatus for the vibration type actuator according to claim 2, wherein the command unit gives a command indicating the frequency according to a difference between each of the one or more physical quantities and a target value for the physical quantity.

4. The control apparatus for the vibration type actuator according to claim 1, wherein the frequency range limiter determines the frequency range based on the frequency response characteristic output from the frequency response characteristic measuring unit and an average of a plurality of values of the frequency of the AC voltage output from the AC voltage generator within a fixed time period.

5. The control apparatus for the vibration type actuator according to claim 1, wherein the frequency range limiter includes memory storing the frequency range, the memory being configured to store in advance frequency range information corresponding to a phase characteristic output by the frequency response characteristic measuring unit, and
   the frequency range limiter limits the frequency range based on the frequency range information stored in the memory according to the phase characteristic output by the frequency response characteristic measuring unit.

6. The control apparatus for the vibration type actuator according to claim 1, wherein the vibration type actuator uses a vibration wave excited by the vibrating member, and wherein a movable member in contact with or indirectly connected to the vibrating member moves relatively by a friction force caused by the vibration wave.

7. The control apparatus for the vibration type actuator according to claim 1, wherein the AC voltage generator generates the AC voltage for applying an excitation force to the vibrating member.

* * * * *